United States Patent [19]

Andresen

[11] 3,725,885

[45] Apr. 3, 1973

[54] METHOD AND APPARATUS FOR AMPLITUDE SENSING AND DATA GATING IN A MAGNETIC-STORAGE DEVICE WITH DIGITAL INTERFACE

[75] Inventor: Rolf Andresen, Broomfield, Colo.

[73] Assignee: International Business Machines Corporation, Armonk, N.Y.

[22] Filed: Sept. 28, 1970

[21] Appl. No.: 76,144

[52] U.S. Cl. ....................................... 340/174.1 H

[51] Int. Cl. ....................................... G11b 5/44

[58] Field of Search .........340/172, 174.1 B, 174.1 H

[56] References Cited

UNITED STATES PATENTS

| | | | |
|---|---|---|---|
| 3,483,542 | 12/1969 | Jensen | 340/174.1 B |
| 3,430,215 | 2/1969 | Krossa et al. | 340/174.1 B |
| 3,395,355 | 7/1968 | Gabor | 340/174.1 B |
| 3,500,385 | 3/1970 | Padalino et al. | 340/174.1 B |

*Primary Examiner*—Vincent P. Canney
*Attorney*—Hanifin & Jancin and Homer L. Knearl

[57] ABSTRACT

A data signal read from magnetic tape is converted from an analog signal into a digital, or quasidigital, signal by hard limiting. This digital signal is combined with an indication as to whether the amplitude of the digital signal is above a predetermined threshold and then passed to a control unit operating with the tape drive. The control unit generates control signals used to change the predetermined threshold used by the tape drive. A change in threshold is made in accordance with detection of a record block and in accordance with error in the record block.

12 Claims, 5 Drawing Figures

INVENTOR
ROLF ANDRESEN

BY

Homer L. Knearl

ATTORNEY

METHOD AND APPARATUS FOR AMPLITUDE SENSING AND DATA GATING IN A MAGNETIC-STORAGE DEVICE WITH DIGITAL INTERFACE

CROSS-REFERENCE TO RELATED APPLICATION

Application Ser. No. 76,143, now U.S. Pat. No. 3,670,304, entitled "Method and Apparatus for Detecting Errors Read from Moving-Magnetic-Storage Device with Digital Interface," by Rolf Andresen, Benjamin Fiorino, and Fred Niccore, filed concurrently herewith, and assigned to the same assignee as the present application, teaches and claims error detection method and apparatus used with the amplitude sense and data gating apparatus which is the subject of the present invention.

BACKGROUND OF THE INVENTION

1. Field of the Invention

The invention relates to a method and apparatus for amplitude sensing a data signal from a tape drive or disk file and gating data in response to the amplitude sensed. More particularly, the invention relates to the gating of data where the data has been converted into digital waveform as opposed to analog waveform and wherein the gating is in response to the amplitude of the digital waveform. In this way, the gated digital waveform carries across a digital interface, not only the digital data, but an indication of the amplitude of the waveform read from a given track by a tape drive or disk file.

2. Description of the Prior Art

The interface between tape drives and control units has almost always been analog. The control unit was designed to utilize, not only the binary information in the analog waveform, but also, the amplitude of the analog waveform.

The amplitude of the analog waveform was utilized in two ways — for error correction and for detection of when a record block was being encountered by the transducer. The error detection was accomplished by using threshold circuits to monitor the amplitude of the received signal from the tape drive. If the particular signal for a given track went below a predetermined threshold, an error was indicated for that track. Alternatively, a parity check was also made to detect parity error. The parity error and the error for a given track, if indicated, could then be used to correct the data. In a situation where more than one track went below the predetermined amplitude threshold, then a multitrack error was indicated and no correction was possible.

The amplitude of the analog signal from the tape drive was also used in the detection of the beginning of a record block. The control unit would look for a series of strong amplitude signals at the beginning or preamble of the record block. In effect, an envelope-type of detection was used whereby after a certain number of preamble bits in a record block had been received, the envelope detector would indicate that a record block was present.

As is well known, the record block for phase-encoded data consists of a preamble, data information, and a postamble. The preamble is made up of 40 zeros followed by a one, and a postamble, by a one followed by 40 zeros. In this way, the record block can be read in either direction, and the postamble and preamble functions are interchangeable.

It is well known in the art to utilize the preamble for acquiring clock signals and for detecting the presence of a record block.

With the conversion to a digital interface, as taught in this invention and the copending, concurrently filed patent application, Ser. No. 76,143, now U.S. Pat. No. 3,670,304, it was desirable to retain the error detection and record block detection functions, but the amplitude information from a tape drive would normally be lost because of the conversion to the digital interface. The problem is, then, the conversion from an analog interface to a digital interface with the retention of and improvement of the error detection and record block detection techniques.

Thus, it is an object of this invention to achieve high reliability through the use of a digital interface between a tape drive or a disk file and its associated control unit without the loss of analog information necessary in the control unit for detection of errors.

It is another object of this invention to increase the reliability of data read from a tape drive by use of a digital interface wherein the digital data signal is gated with an amplitude indicating signal.

SUMMARY OF THE INVENTION

In accordance with this invention, the above objects are accomplished by converting the analog data signal at the tape drive into a two-level signal, which can utilize digital circuitry, and at the same time by amplitude sensing and gating the two-level or digital signal at the tape drive in accordance with the amplitude sensed so as to provide an indication, not only of the data, but also the amplitude of the signal at the tape drive. This gated digital signal is then utilized by the control unit to generate control signals. The amplitude sense and data gate in the tape drive responds to these control signals to adjust its threshold as it performs the amplitude sense and data gating function.

The great advantage of this invention is that it has extremely high reliability, in that, it uses digital circuitry which is, inherently, noise immune. In addition, the use of digital components, such as standard logic blocks which can be mass produced as integrated circuit chips, greatly reduces the cost of the data detecting and correcting apparatus in a control unit and the gating apparatus used with the interface between the control unit and the tape drive. Thus, high reliability has been achieved with the unexpected additional advantage of lower cost.

The foregoing and other features, and advantages of the invention will be apparent from the following more particular description of the preferred embodiment of the invention, as illustrated in the accompanying drawings.

DESCRIPTION OF THE PREFERRED EMBODIMENT

Figure 1:
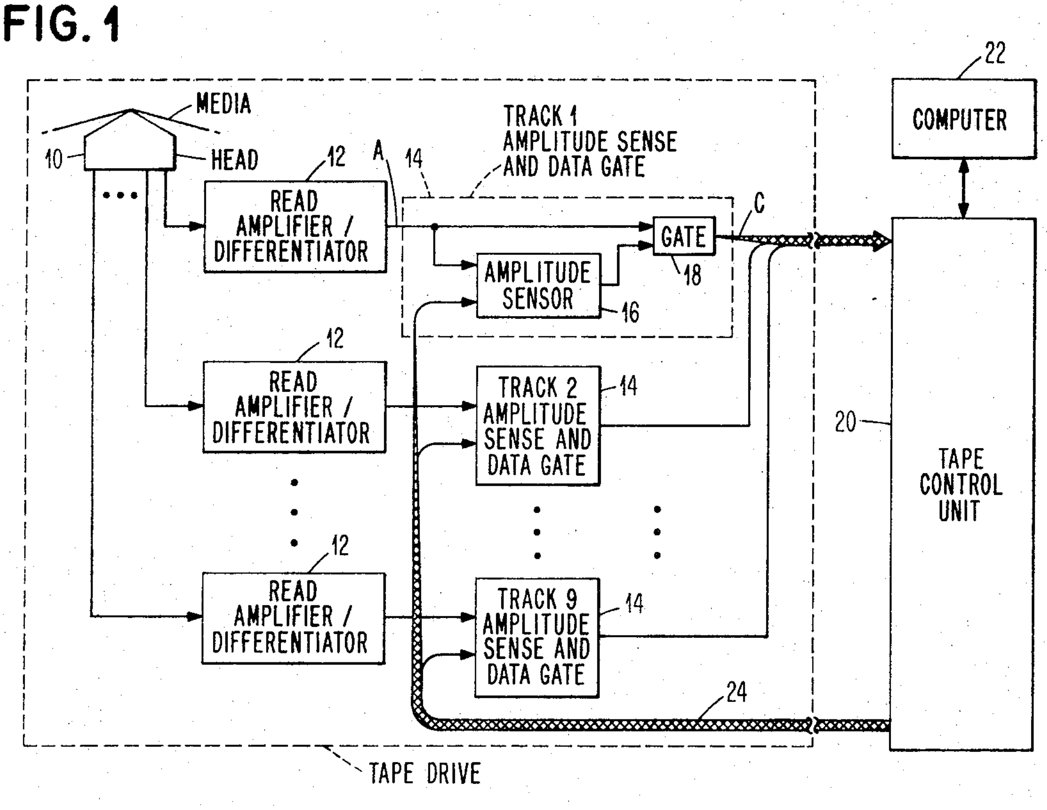
FIG. 1 shows a schematic block diagram of a preferred embodiment of the invention as implemented with a plurality of tracks reading a moving-magnetic-storage media.

In FIG. 1, the invention is shown utilized in each track of a tape drive so as to provide the digital interface. Read head 10 contains a multiplicity of read-head gaps, each gap reading a particular track on a tape. Signal read by each gap is applied to a read amplifier/differentiator 12. These conventional preamplification circuits also include a differentiation function. In addition, the read amplifier 12 contains a hard-limiting circuit so that the signal waveform from the amplifier 12 will appear as a two-level signal, i.e., essentially digital signal. However, hard limiting has the characteristics that as the amplitude of the read signal decreases, the hard limiting will be less effective. So that below a given percent of nominal signal, the hard-limited, or digital, signal out of the read amplifier 12 will begin to revert to an analog signal.

The hard-limited or digital signals out of amplifiers 12 are applied to the amplitude sense and data gates 14 for each track. Each amplitude sense and data gate 14 consists of an amplitude sensor 16 and a data gate 18. The function of the amplitude sensor 16 is to monitor the digital signal out of the read amplifier 12 and to generate an enabling signal for AND gate 18 so long as the amplitude of the digital signal is above a predetermined level. If the amplitude of the digital signal slips below the predetermined level, the amplitude sensor 16 will no longer have an output sufficient to enable gate 18, and gate 18 will block further passage of data from that track to a tape control unit 20.

The tape control unit 20 serves to detect the data and errors in the data and communicate the data to and from a computer 22. In accordance with the detection of good data and erroneous data, the tape control unit 20 will generate control signals which are passed back over cable 24 to the amplitude sense and data gates 14 in the tape drive.

As just pointed out, the amplitude sensor 16 will drop its output and thus block data from a track when the amplitude of the digital waveform from read amplifier 12 goes below a predetermined level. The drop in amplitude of a digital waveform is not typical of digital waveforms. On the other hand, it should be remembered that this digital waveform, although it looks like a digital signal, is in fact a hard-limited analog signal. Thus, when the amplitude of this original read signal starts to deteriorate, the hard limiting will no longer be effective, and the digital signal will tend to revert to an analog signal with an amplitude. The thresholds are set up so that the amplitude sensor will tend to block data when the amplitude of the waveform from the read amplifier is so low that a number of errors are being detected by the tape control unit 20. To make this adjustment, the amplitude sensor 15 receives and responds to control signals from the tape control unit.

Figure 2:
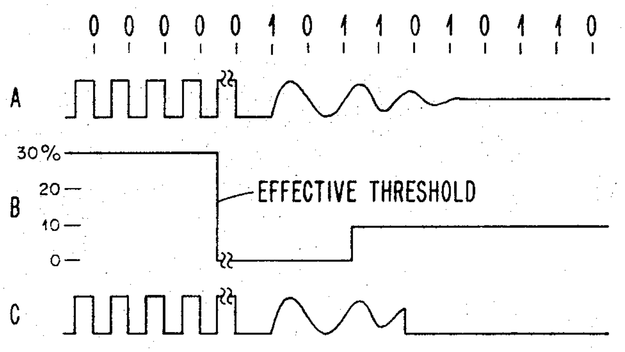
FIG. 2 shows some typical waveforms present in the apparatus of FIG. 1.

In the preferred embodiment, there are two control signals applied to each amplitude sensor 16 in each track. By use of two control signals, it is possible to achieve three effective thresholds that the amplitude sense and data gate can be set at. These thresholds are used at various times in a record block in accordance with conditions of the data as detected by the tape control unit 20. The various thresholds used relative to the signal in the record block being read are shown in FIG. 2. Waveform A is the hard-limited, or digital, signal from the read amplifier 12. Waveform B shows the effective threshold being used by the amplitude sense and data gate, and waveform C shows the gated digital signal which is passed by gate 18 in response to the enabling signal from amplitude sensor 16.

The data making up waveform A consists of a record block, including a preamble, the record data, and a postamble. The preamble is made up of 40 zeros followed by a one, and the postamble is made up of a one followed by 40 zeros. In this way, the record block can be read in either direction, and the postamble and preamble functions are interchangeable.

Initially, the threshold used by the amplitude sense and data gate is set at a high level, as for example, 30 percent of a nominal signal. If the preamble of a record block satisfies this amplitude condition, the amplitude sensor will enable the AND gate 18 which will then pass the preamble data to the tape control unit. The tape control unit looks for a history of good data, which could be defined in a number ways, and sends back a signal over cable 24 which says, in effect, good data is present, change the threshold to a very low level. The threshold could be changed to essentially zero and the gate 18 would be enabled by the amplitude sensor to pass anything out of the read amplifier 12.

So long as the tape control unit does not detect errors, it is to its advantage to receive all of the digital signals it can from a given track. At the first instance of detection of an error, either amplitude, phase or parity, the tape control unit would generate a change threshold signal which would be sent back over the cable 24 to the amplitude sense and data gate. The threshold would then be raised either back up to the original 30 percent level or to a level somewhat lower than the initial high level used to identify a record block present. For example, this second threshold level could be 10 percent of a nominal signal. If the amplitude sense and data gate detects that the signal from read amplifier 12 is still satisfying at least 10 percent threshold level, it will continue to pass the read signal to the tape control unit 20. However, if the read signal falls below the 10 percent threshold, then the amplitude sensor would no longer enable the gate 18 and thus block further passage of data to the tape control unit.

Since the amplitude sensor has blocked the gate 18, and, thus, prevented any further data flow to the tape control unit from a given track, this condition effectively also tells the tape control unit that that read signal has fallen below the desired threshold. This is amplitude information which can be utilized by the control unit in its error detection and correction apparatus. The gating of the signal and the use of the thresholds is evident in waveforms B and C of FIG. 2. Waveform B shows that, initially, the threshold is at 30 percent until the control unit identifies good data, and then the threshold drops to zero. Eventually, when the waveform A begins to deteriorate as indicated by its reversion from digital form back to a low amplitude analog waveform, an error is detected by the tape control unit, and the threshold is raised back to 10 percent. Sometime after the raising of the threshold to the 10 percent level, the amplitude sense and data gate detects that the amplitude of waveform A is falling below the 10 percent level, and gate 18 shuts down. Thus, waveform E drops its signal indicating that the data waveform no longer satisfies the predetermined threshold.

Figure 3:
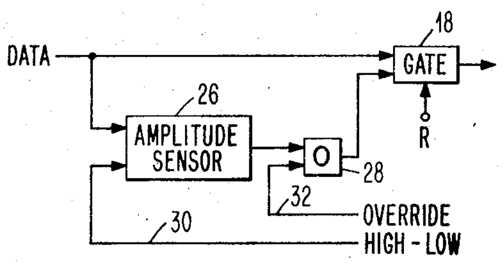
FIG. 3 shows an implementation of the amplitude sense and data gating function wherein one control line is used to override the amplitude sense function, and a second control line is used to change the threshold of the amplitude sense function.
Figure 4:
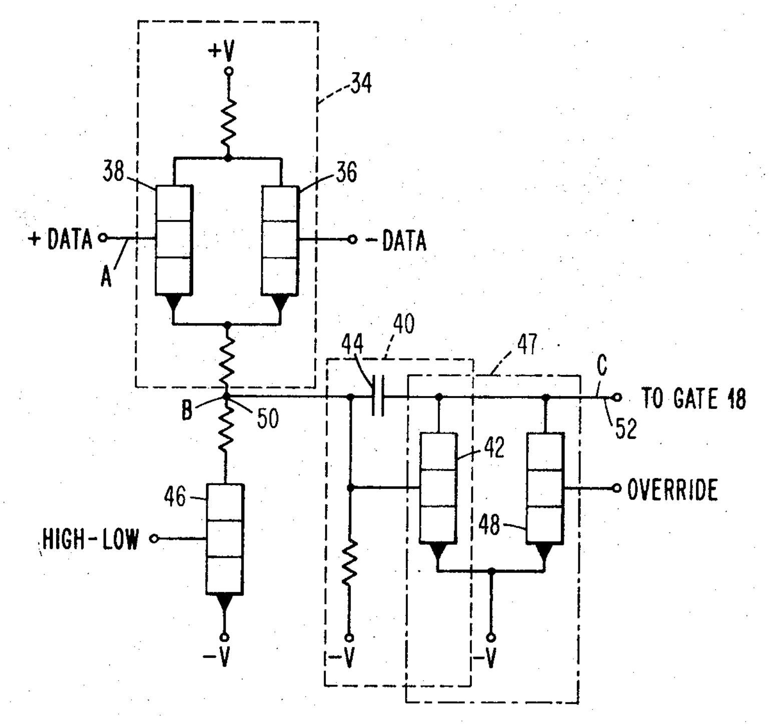
FIG. 4 shows a circuit schematic for implementing the amplitude sense and override amplitude sense functions of FIG. 3.

Preferred implementations of the amplitude sense and data gate function are shown in FIGS. 3 and 4. In the embodiments of FIGS. 3 and 4, the zero-threshold function is achieved by using an OR circuit 28 and applying an override input signal to the OR. The effect is that any time an override signal is received from the tape control unit, the amplitude sensor 26 no longer has any effect in gating data through gate 18 because the override signal is always passed by OR 28 to enable gate 18. Thus, the override signal is the same thing as having a zero threshold.

In addition in FIG. 3, the amplitude sensor 26 has a two-threshold function as opposed to the amplitude sensor 16 which has a three-threshold function. Two thresholds can be accomplished by simply using a two-level waveform to signal whether the threshold should be at a high level or a low level. Such a signal would be generated by the control unit in cooperation with the tape drive.

The three thresholds pictured in waveform B of FIG. 2 can thus be accomplished in FIG. 3 by having line 30 control the amplitude sensor 26 to set it at a high sense level, 30 percent, at the beginning of the record block. The override signal on line 32 would then be present when the control unit detects the presence of good data in the record block, and this would effectively lower the threshold to zero as in waveform B of FIG. 2. If an error is then detected, the override signal would disappear which would put the amplitude sensor back into operation to control gate 18. Simultaneously, the signal on line 30 would change to a low level and change the threshold in sensor 26 to a low level, such as the 10 percent level shown in waveform B of FIG. 2.

Of course, it is not necessary to use multiple thresholds. However, the versatility and adaptability of the tape drive and control unit and their reliability in gating data through to the computer is increased if multiple thresholds are used. Also, it will be appreciated that the choice of thresholds used will depend upon the data signal that is being worked with, and upon the error detection apparatus that is used in the control unit.

As described in FIG. 3, the gate 18 is a zero threshold gate. In other words, the presence of a signal from OR gate 28 will enable the gate 18 to pass the data signal. The 10 and 30 percent thresholds are in the amplitude sensor 26. If the amplitude of the data signal exceeds the threshold being used by sensor 26, the sensor will have an output which would be passed by OR 28 to enable gate 18. In this configuration, sensor 26 could be a full-wave rectifier followed by an integrator followed by a Schmitt trigger having two selectable thresholds. The thresholds could be selected by switching a transistor with the signal on line 30.

An alternative configuration for the amplitude sensor 26 and OR gate 28 in FIG. 3 is shown in FIG. 4. As will be explained hereinafter, the circuits in FIG. 4 do not contain a threshold circuit. Instead, these circuits are designed to work with a data gate which uses a threshold other than zero. Thus, the level of the signal, passed by the circuits of FIG. 4 to the gate 18, controls whether the gate 18 is enabled to pass the data signal.

The schematic in FIG. 4 can be divided into four sections. First, there is a full-wave rectifier 34 made up of transistors 36 and 38. Second, there is a Miller integrator 40 made up of transistor 42 and capacitor 44. Third, there is a transistor 46 which is switched to change the sense level from high to low, and, fourth, there is the OR circuit 47 which consists of transistors 42 and 48. The rectifier 34, the Miller integrator 40 and transistor 46 perform the amplitude sense function. Notice that transistor 42 is shared with the Miller integrator 40 and the OR circuit 47.

In operation, the positive data signal is applied to the base of transistor 38 in the full-wave rectifier. In addition, the data signal is inverted by an inverter, not shown, and applied to the base of transistor 36 of the full-wave rectifier. The output of the rectifier at node 50 is a full-wave rectified data signal. The signal is then applied to the Miller integrator 40 and will cause the integrator to have an output over line 52 which will tend to be a DC level indicative of the amplitude of the data signal applied to the full-wave rectifier.

The degree to which the full-wave rectified signal at node 50 is flattened into a DC level will depend upon the size of the capacitor 44. As is well known, in the Miller integrator the capacitor 44 operates in conjunction with transistor 42 to effectively slow down the transitions in turning on and turning off the transistor 42 as the rectified peaks from node 50 are applied to the base of the transistor 42. The effect is that the first peak causes a voltage to build up gradually at the collector of transistor 42, and before that voltage at the collector will decay very far, the next peak will cause the voltage to again rise at the collector of transistor 42. Thus, if the capacity of capacitor 44 is increased, the curve from peak-to-peak will become flatter and essentially the voltage at node 52 will be a DC level. The voltage level on line 52 is the enabling signal applied to gate 18.

As mentioned above, when gate 18 operates with the circuits of FIG. 4, it functions as a threshold gate that uses a reference threshold voltage. So long as the output signal from OR circuit 47 exceeds the reference voltage, then the gate 18 is enabled. Thus, if the amplitude of the data signal is such that the voltage out on line 52 exceeds the reference voltage in the gate 18, gate 18 is enabled, and the data signal is passed by gate 18 to the control unit.

To effectively change sense levels in the amplitude sensor, it is necessary to turn on or off the transistor 46 in FIG. 4. When transistor 46 is on, part of the current in the full-wave rectified signal that would have been used to charge capacitor 44 is now shunted away by transistor 46. Thus, with transistor 46 on, it takes a larger amplitude input data signal to achieve the same voltage level out on line 52. In the high threshold mode, or 30 percent threshold, transistor 46 is turned on, and a larger data signal is required before the voltage on line 52 sensor will exceed the reference voltage used by the gate 18.

A low threshold condition is achieved by turning off transistor 46 in FIG. 4. Then, the data signal can be of a smaller amplitude and still produce a signal on line 52 which will be in excess of the reference voltage utilized in the gate 18 to control the gating of data. A simple implementation of the gate 18 might be a Schmitt trigger to generate an output so long as the input voltage was above the triggering level and an AND gate operating off of the output of the Schmitt trigger to pass the data when the Schmitt trigger has an output.

Figure 5:
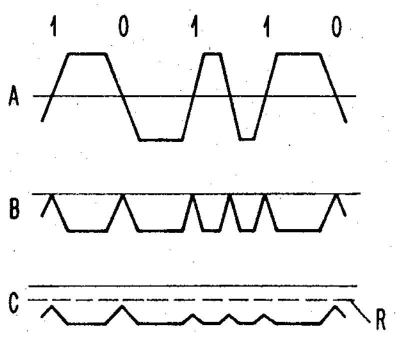
FIG. 5 shows some typical waveforms present in the circuit of FIG. 4.

Some waveforms that appear in the circuit of FIG. 4 are shown in FIG. 5. In addition, the reference threshold level used by gate 18 with the circuits of FIG. 4 is also shown with waveform C. Waveform C is the output of the OR gate 47 on line 52. Waveform A constitutes the positive data signal applied to transistor 38. Waveform B is the full-wave rectified signal at node 50.

The override function is accomplished by the OR circuit 28 utilizing both transistors 42 and 48 to make up the OR gate. In effect, when the override signal is present, transistor 48 is turned on and fixes the voltage on line 52 near −V volts. Thus, irrespective of the operation of the Miller integrator, the voltage on line 52 is held near −V volts. This voltage will exceed the threshold of gate 18, and gate 18 is enabled until the override signal is removed turning off transistor 48. The circuitry shown in FIG. 4 and the waveforms associated with it in FIG. 5 represent negative going signals, and, thus, negative logic would be used. However, the circuit could be redesigned for positive signals and positive going logic. It will also be appreciated that there are a multitude of amplitude sensors and logic gates available that could be used in place of the amplitude sensor and OR gate combinations shown in FIGS. 3 and 4.

The real significance of the invention is not in the choice of amplitude sensors and logic gates, but in the fact that a digital interface can be placed between a tape drive and its control unit (or for that matter, any moving-magnetic-storage-device and its control unit), and the amplitude information useful in the control unit is not lost. Instead, the amplitude sensing function can be provided in the tape drive and utilized to gate the digital data to the control unit and thereby preserve the amplitude information. The function of gating the data means that amplitude information is carried over the digital line to the tape drive.

While the invention has been particularly shown and described with reference to preferred embodiments particularly using tape drives, it will be understood by those skilled in the art that the foregoing and other changes in form and details to adapt the invention to similarly functioning apparatus and to the environment of any moving-magnetic-storage medium may be made without departing from the spirit and scope of the invention.

What is claimed is:

1. Apparatus for amplitude sensing and gating data read by a transducer moving relative to a magnetic-storage medium so that an amplitude gated data signal is generated for passage across a digital interface, the sensing and gating being done in response to threshold control signals received from a control unit across the digital interface, said apparatus comprising:

means for sensing the amplitude of the data signal read from the magnetic-storage medium;

means responsive to said sensing means for generating an enabling signal indicating when the sensed amplitude of the data signal exceeds a reference threshold;

means responsive to the enabling signal for gating the data signal across the digital interface only if the amplitude of the data signal exceeds the reference threshold;

means for adjusting the reference threshold to a threshold indicated by the threshold control signals received from the control unit.

2. Apparatus of claim 1 wherein said generating means comprises:

voltage level detecting means for detecting the sensed amplitude of the data signal and for generating an enabling signal only if the amplitude of the data signal exceeds the reference threshold.

3. Apparatus for amplitude sensing and gating data read by a transducer moving relative to a magnetic-storage medium so that an amplitude gated data signal is generated for passage across a digital interface, the sensing and gating being done in response to threshold control signals received from a control unit across the digital interface, said apparatus comprising:

means for full-wave rectifying the data signal;

means for integrating the full-wave rectified data signal and thereby generating an enabling signal whose voltage level varies with variations in the amplitude of the data signal;

means responsive to the enabling signal for gating the data signal across the digital interface only if the amplitude of the data signal exceeds the reference threshold;

means for adjusting the reference threshold to a threshold indicated by the threshold control signals received from the control unit.

4. In a magnetic-storage device having apparatus for hard-limiting the signal read by a transducer moving relative to the magnetic-storage medium so as to produce a quasi-digital signal for passage across a digital interface, apparatus for preserving the amplitude information in the digital signal passed across the digital interface comprising:

means for measuring the strength of the quasi-digital signal and generating a potency signal indicative of signal strength;

means responsive to the potency signal for gating the digital signal across said interface if the strength of the digital signal is above a threshold and for blocking the digital signal from getting across the interface if the strength of the digital signal is below the threshold;

means responsive to a control signal received across the interface for changing the threshold.

5. Apparatus of claim 4 wherein said measuring means comprises:

means for rectifying the quasi-digital signal;

means for low-pass filtering the rectified digital signal and thereby generating a potency signal varying with variations in the strength of the digital signal.

6. Apparatus for combining data information, read by a transducer moving relative to a magnetic-storage medium, with data signal amplitude information into a digital signal for passage across a digital interface, said apparatus being responsive to control signals received from across the digital interface and said apparatus comprising:

means for detecting when the amplitude of the data signal exceeds a gating threshold and generating an enabling signal only if the amplitude of the data signal exceeds the gating threshold;

means responsive to the enabling signal for gating the data signal over the interface when the enabling signal is present and for gating a predetermined signal over the interface when the enabling signal is not present;

means for changing the gating threshold in response to control signals received across the digital interface.

7. Apparatus of claim 6 and in addition:

means for overriding said detecting means in response to control signals received across the digital interface and generating an enabling signal irrespective of the amplitude of the data signal.

8. Apparatus for combining data information, read by a transducer moving relative to a magnetic-storage medium, with data signal amplitude information into a digital signal for passage across a digital interface, said apparatus being responsive to control signals received from across the digital interface and said apparatus comprising:

means for generating an enabling signal whose voltage level varies with the amplitude of the data signal;

means responsive to the enabling signal for gating the data signal over the digital interface when the voltage level of the enabling signal exceeds a gating threshold and for gating a predetermined signal over the digital interface when the voltage level of the enabling signal does not exceed the gating threshold;

means for changing the gating threshold in response to control signals received across the digital interface.

9. Apparatus of claim 8 and in addition:

means for overriding said generating means in response to control signals received across the digital interface and producing an enabling signal whose voltage level exceeds the gating threshold irrespective of the amplitude of the data signal.

10. Method for combining a data signal, read by a transducer moving relative to a magnetic-storage medium, with data signal amplitude information for transmission across a digital interface to a control unit comprising the steps of:

detecting the amplitude of the data signal;

passing the data signal across the digital interface so long as the amplitude of the data signal exceeds a threshold;

passing a signal indicative of insufficient amplitude across the digital interface when the amplitude of the data signal does not exceed the threshold;

adjusting the threshold in response to control signals received from the control unit across the digital interface.

11. Method for sending a data signal read by a transducer moving relative to a magnetic-storage medium across a digital interface while retaining some signal strength information in the signal sent across the interface so that a control unit on the other side of the interface may send back control signals, said method comprising the steps of:

sensing the strength of the data signal;

comparing the strength of the data signal to a reference level;

gating the data signal across the digital interface so long as the strength of the data signal exceeds the reference level;

sending a signal indicating insufficient data signal strength across the digital interface if the strength does not exceed the reference level;

changing the reference level in response to the control signals received from the control unit across the interface.

12. The method of claim 11 and in addition:

overriding said comparing step in response to the control signals from the control unit so that the data signal is gated across the digital interface irrespective of the strength of the data signal.

* * * * *